United States Patent
Lee

(10) Patent No.: US 8,149,225 B2
(45) Date of Patent: Apr. 3, 2012

(54) DISPLAY APPARATUS FOR REFRIGERATOR

(75) Inventor: Ik-Kyu Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 452 days.

(21) Appl. No.: 12/447,608

(22) PCT Filed: Dec. 6, 2006

(86) PCT No.: PCT/KR2006/005230

§ 371 (c)(1), (2), (4) Date: Apr. 28, 2009

(87) PCT Pub. No.: WO2008/069352

PCT Pub. Date: Jun. 12, 2008

(65) Prior Publication Data

US 2010/0045617 A1 Feb. 25, 2010

(51) Int. Cl.
*G06F 3/041* (2006.01)
(52) U.S. Cl. .......................................... 345/173; 62/246
(58) Field of Classification Search ............ 345/173–179
See application file for complete search history.

(56) References Cited

U.S. PATENT DOCUMENTS

2005/0258961 A1* 11/2005 Kimball et al. ............ 340/572.1

FOREIGN PATENT DOCUMENTS

| CN | 2823932 Y | 10/2006 |
| JP | 2005-164190 A | 6/2005 |
| KR | 2002-0047618 A | 6/2002 |
| KR | 2003-0073294 A | 9/2003 |

* cited by examiner

*Primary Examiner* — Kevin M Nguyen
*Assistant Examiner* — Cory Almeida
(74) *Attorney, Agent, or Firm* — Birch, Stewart, Kolasch, Birch, LLP

(57) ABSTRACT

The present invention discloses a display apparatus (30) for a refrigerator which can be operated by using a touch screen (60). The display apparatus for the refrigerator includes a control unit (40) for controlling the refrigerator, a display unit (50) installed on the front surface of the control unit, for displaying information from the control unit, and a transparent touch screen (60) installed to cover the front surface of the display unit (50) and the front surface of the control unit (40), and electrically connected to the control unit, for applying a clicking input of the user to the control unit. The display unit (50) is externally shown through the transparent touch screen (60). A printed matter (70) is printed on the touch screen except the portion corresponding to the display unit.

4 Claims, 2 Drawing Sheets

[Fig. 1]
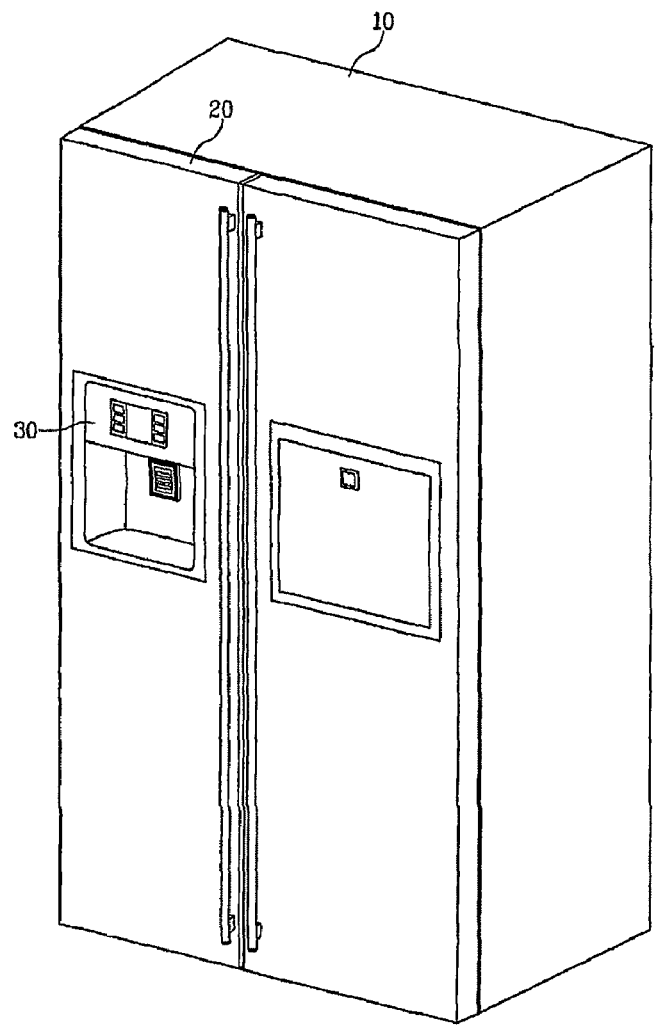
[Fig. 2]
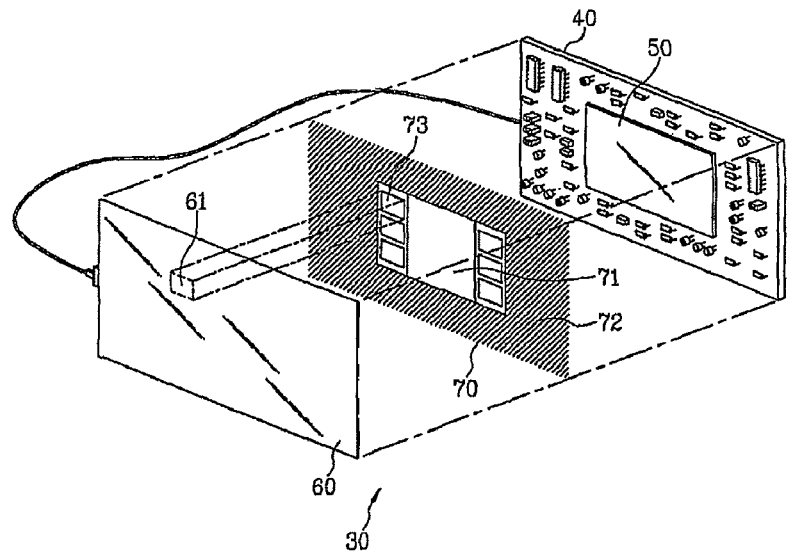

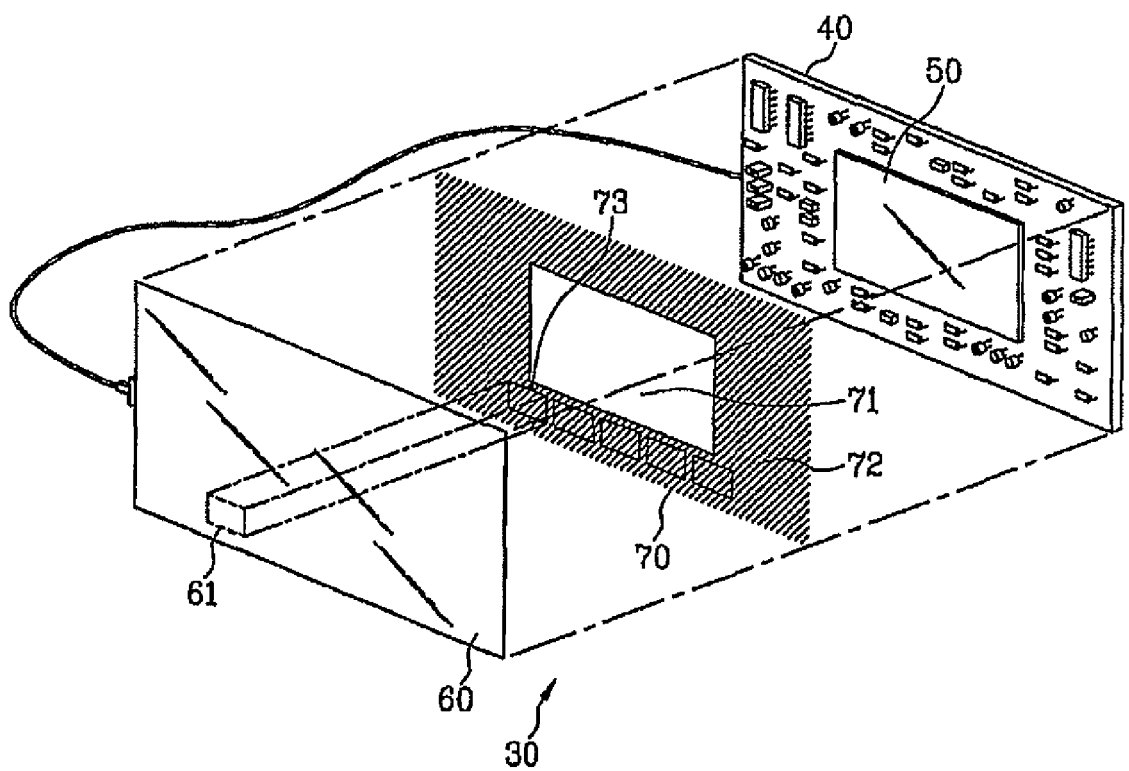

DISPLAY APPARATUS FOR REFRIGERATOR

TECHNICAL FIELD

The present invention relates to a display apparatus for a refrigerator, and more particularly, to a display apparatus for a refrigerator which can be operated by using a touch screen.

BACKGROUND ART

In general, a display apparatus for controlling specific functions of a refrigerator or displaying the state of the refrigerator is installed in the refrigerator.

The conventional refrigerator includes control devices consisting of a main microcomputer (or a main control unit) mounted on an upper portion of a main body, for controlling freezing and refrigerating, and a sub microcomputer built in the display apparatus on a refrigerator door. The display apparatus provides information on the state of the refrigerator (for example, a set temperature of a freezing chamber, a set temperature of a refrigerating chamber, and a service type of a dispenser such as cubic ice, flake ice and water). Normally, the display apparatus includes a control unit, an operation unit, a display unit and a cover.

When the user operates buttons of the operation unit of the display apparatus, the control unit displays operation information of the user or control information through the display unit according to the selective operation of the user, and controls the refrigerator. For example, the user can set the temperatures of the freezing chamber and the refrigerating chamber, the service type of the dispenser, and the current time.

The control unit is a circuit board on which storage devices and arithmetic devices have been installed. The control unit contains the control information and state information of the refrigerator, the input information of the user, and sensing information of sensors.

The operation unit is installed on the front surface of the circuit board of the control unit, and connected to an input terminal of the circuit board, for transmitting an operation signal to the control unit. Generally, the operation unit is formed in a box shape, and composed of buttons with elasticity to the forward direction of the circuit board. The user can operate the buttons by clicking.

The operation information or control information of each button is printed on the front surfaces of the buttons of the operation unit, or stickers printed with the information are adhered thereto.

The display unit is a liquid crystal screen for displaying the state information, control information or operation information of the refrigerator under the control of the control unit. The display unit is installed on the front surface of the control unit.

The display unit includes menu marks and luminescent marks. The menu marks display the operation information and control information of the display apparatus by characters or pictures. In order to display selection of one of the menu marks, the luminescent mark varies the brightness of the menu mark by flickering the menu mark or the rear luminescent body thereof.

In addition to the temperature, humidity and illumination of the storage chambers, the refrigerator provides health information on the user and general information and cooking information on foods. The number of the display marks is increased to display such information.

The cover is formed in the same plate shape as that of the front surface of the control unit, for covering the front surface of the display apparatus. The cover includes a see-through window and button holes.

In a state where the cover is adhered to the front surface of the display apparatus, the see-through window is disposed on the front surface of the display unit. The see-through window is made of a transparent material, for externally showing the display unit.

In addition, the button holes are formed by opening the parts of the cover corresponding to the front portions of the buttons of the operation unit protruded from the front surface of the display apparatus. Accordingly, the buttons can be protruded to the forward direction of the cover.

To improve the external appearance of the display apparatus for the refrigerator, the front surface of the control unit can be covered with an exterior finishing member made of a transparent material such as glass. The exterior finishing member is installed at the front portion of the display unit formed on the front surface of the control unit, and normally installed on the front surface of the control unit to cover or expose a plurality of buttons or switches formed at the outer portion of the display unit.

The positions and explanations of the display unit and the buttons of the operation unit are printed on the front or rear surface of the exterior finishing member, so that the user can easily discriminate the display unit from the operation unit.

DISCLOSURE OF INVENTION

Technical Problem

The present invention is achieved to solve the above problems. An object of the present invention is to provide a display apparatus for a refrigerator which can be operated by using a freely-used touch screen, instead of using an operation unit such as buttons.

Another object of the present invention is to provide a display apparatus for a refrigerator which serves as an exterior finishing member for covering the whole surfaces of a control unit and a display unit.

Yet another object of the present invention is to provide a display apparatus for a refrigerator in which a printed matter printed with operation display units and/or operation points is formed on a touch screen.

Technical Solution

In order to achieve the above-described objects of the invention, there is provided a display apparatus for a refrigerator, including: a control unit for controlling the refrigerator; a display unit installed on the front surface of the control unit, for displaying information from the control unit; and a transparent touch screen installed to cover the front surface of the display unit and the front surface of the control unit, and electrically connected to the control unit, for applying a clicking input of the user to the control unit, wherein the display unit is externally shown through the transparent touch screen, and a printed matter is printed on the touch screen except the portion corresponding to the display unit.

Preferably, the display apparatus includes a printed matter printed with operation points of the touch screen on the touch screen and with operation, display units for displaying operation information displayed on the display unit.

Preferably, the display apparatus includes a printed matter printed with operation display units for displaying operation points of the touch screen on the touch screen corresponding to the outer portion of the display unit.

Preferably, the printed matter is printed on the rear surface of the touch screen.

Preferably, the printed matter is opaque.

In addition, there is provided an input apparatus for a display apparatus for a refrigerator including a display unit for displaying information, the input apparatus including: a touch screen mounted on the front surface of the display unit, for recognizing clicking of the user; and a printed unit for externally showing at least part of the display unit through the touch screen.

BRIEF DESCRIPTION OF THE DRAWINGS

The present invention will become better understood with reference to the accompanying drawings which are given only by way of illustration and thus are not limitative of the present invention, wherein:

FIG. 1 is a perspective view illustrating a refrigerator in accordance with the present invention;

FIG. 2 is a disassembly perspective view illustrating a display apparatus in accordance with one preferred embodiment of the present invention; and FIG. 3 is a disassembly perspective view illustrating a display apparatus in accordance with another preferred embodiment of the present invention.

MODE FOR THE INVENTION

A display apparatus for a refrigerator in accordance with the preferred embodiments of the present invention will now be described in detail with reference to the accompanying drawings.

FIG. 1 is a perspective view illustrating a display apparatus 30 formed on a front surface of a door 20 of a refrigerator 10. FIG. 2 is a disassembly perspective view illustrating a touch screen 60 of the display apparatus 30 and a printed unit printed on the rear surface of the touch screen 60 in accordance with one preferred embodiment of the present invention. FIG. 3 is a disassembly perspective view illustrating a state where operation points 61 of the display apparatus 30 are formed at the outer portion of the display unit 50 (namely, the region which is not included in the touch screen region 60 corresponding to the display unit 50) in accordance with another preferred embodiment of the present invention.

In accordance with the present invention, the touch screen 60 is installed on the front surfaces of the control unit 40 and the display unit 50 of the display apparatus 30, and a printed matter 70 for displaying the display unit 50 and the operation points 61 is printed on the touch screen 60.

As illustrated in FIGS. 2 and 3, the display apparatus 30 includes the control unit 40, the display unit 50, the touch screen 60 and the printed matter 70.

The control unit 40 communicates with a main control unit (not shown) of the refrigerator 10, receives state information of the refrigerator 10 from the main control unit, and transmits a control command of the user to the main control unit. Therefore, the user can set temperatures of a freezing chamber and a refrigerating chamber, a service type of a dispenser and a current time, and input other information through the control unit 40. The control unit 40 is a microprocessor including various arithmetic devices and storage devices.

The display unit 50 is a liquid crystal screen adhered to the front surface of the control unit 40, for displaying control information and operation information of the control unit 40 and input information of the user.

Preferably, the display unit 50 is adhered to the center portion of the front surface of the control unit 40.

The touch screen 60 is operated by clicking of the user, for inputting input/output information to the control unit 40. The touch screen 60 is adhered to the front surface of the control unit 40 or the display unit 50, for forming the front external appearance of the display apparatus 30.

Various types of touch screens can be used as the touch screen 60. For example, a conductive film type touch screen includes a pair of films, a pair of electrodes adhered to the inner surfaces of the pair of films, respectively, and a spacer interposed to keep a gap between the pair of electrodes. In the case of an optical sensor type touch screen, an infrared sensor irradiates infrared rays to an inner surface of one side film, for sensing the other side film inwardly caved by clicking of the user. In the case of a thin metal line filled touch screen, thin metal lines are arranged in a lattice shape on an inner surface of one side film, and an electrode of the other side is bent and caved to contact the thin metal lines. A pressure sensor type touch screen includes a pressure sensor between a pair of films, for sensing a pressurized point of one side film by the user. An ultrasonic wave emission type touch screen senses an intermittent point of ultrasonic waves emitted between a pair of films.

A connection terminal is outwardly protruded from one side of the touch screen 60, and electrically connected to the control unit 40 through an electric wire.

Preferably, the whole surface of the touch screen 60 can sense clicking of the user. The specific portions consist of the operation points 61 serving as the touch screen 60 by information displayed on the display unit 50 or printed operation display units 73.

Preferably, the touch, screen 60 is made of a transparent material so that the user can see the elements or information therein.

In this embodiment, the operation points 61 correspond to the peripheral regions or edges of the display unit 50.

The printed matter 70 is printed on the touch screen 60, and composed of a see-through unit 71, an exterior finishing unit 72 and the operation display units 73.

The see-through unit 71 is formed by removing the center portion of the printed matter 70, namely, the printed matter 70 corresponding to the display unit 50, for making the touch screen 60 adhered to the front surface of the display unit 50 transparent. It is also possible to form the printed matter 70 on the touch screen 60 except the see-through unit 71.

The exterior finishing unit 72 is formed by printing colors or pictures on the whole printed matter 70 except the see-through unit 71, for covering the whole surface of the control unit 40 except the display unit 50.

The operation points 61 are formed on the touch screen 60 to correspond to the operation information displayed on the screen of the display unit 50. The operation display units 73 are formed by printing pictures or the likes for indicating the positions of the operation points 61 or explaining the operations of the operation points 61 on the touch screen 60 to correspond to the operation information of the display unit 50 and the operation points 61.

In this embodiment, the operation display units 73 are formed by printing pictures for forming the edges of the clicking portions of the operation points 61 or characters for explaining the operations of the operation points 61.

As shown in FIG. 3, the operation display units 73 and the operation points 61 can be formed in the exterior finishing unit 72 outside the display unit 50.

In this embodiment, the operation points 61 of the touch screen 60 operated by the user are arranged outside the display unit 50, especially, at the lower portion of the display unit 50. The operation display units 73 are formed in the exterior finishing unit 72 of the printed matter 70 to correspond to the operation points 61. Since the elements of the control unit 40 are disposed at the rear portion of the operation display units 73, the operation display units 73 are preferably opaquely printed.

Preferably, the printed matter 70 is printed on the rear surface of the touch screen 60 to be protected from external objects.

The operation of the display apparatus for the refrigerator in accordance with the present invention will now be described.

When the user intends to operate the refrigerator 10 through the display apparatus 30 of the refrigerator 10, the user observes the display unit 50 formed on the front surface of the display apparatus 30 of the refrigerator 10. Here, the touch screen 60 has been transparently formed at the front portion of the display unit 50, and the see-through unit 71 has been formed by removing the printed matter 70 printed on the touch screen 60 at the front portion of the display unit 50. Accordingly, the user observes the display unit 50 through the transparent portion of the touch screen 60 and the see-through unit 71 of the printed matter 70.

The user observing the display unit 50 finds the operation display unit 73 displaying the target control information, and clicks the operation point 61 of the touch screen 60 corresponding to the corresponding operation display unit 73, thereby controlling the refrigerator 10.

In the case that the operation display units 73 are formed at both sides of the display unit 50 and the display unit 50 displays the explanation of the corresponding operation point 61, the user reads the information of the display unit 50 corresponding to the operation point 61 and the operation display unit 73, and clicks the operation point 61, thereby controlling the refrigerator 10.

When the user clicks the operation point 61, one side film of the touch screen 60 is inwardly caved. As one side film is inwardly caved, an electrode adhered to the inner surface of the film contacts the other side electrode, to generate coordinates information on the part operated by the user.

The coordinates information sensed and generated by the touch screen 60 is transmitted to the control unit 40 through the connection terminal formed at one side of the screen 60. The control unit 40 stores the coordinates information and the corresponding control information, compares the information, and performs the control operation corresponding to the operation point 61 clicked by the user.

In the case that the operation points 61 and the operation display units 73 are formed outside the display unit 50, the user clicks the operation point 61 of the touch screen 60 formed at the bottom end of the display unit 50. As the user pressurizes the operation point 61, one side film of the operation point 61 is caved to the direction of the other side film, so that terminals formed on the inner surfaces of the pair of films can contact each other. The corresponding coordinates information is transmitted to the control unit 40 of the display apparatus 30. The control unit 40 deduces or outputs the control information corresponding to the coordinates. The control unit 40 independently performs the control operation according to the control information, or transmits the control information to the main control unit.

The printed matter 70 printed on the rear surface of the touch screen 60 at the lower portion of the display unit 50 is opaque. Since the operation display units 73 are opaque, the inner elements of the operation points 61 are not externally shown. Therefore, the user cannot see the display unit 50 through the operation display units 73. The explanation of the operation unit is added to the operation display units 73, for explaining the operation points 61.

If the whole surface of the touch screen 60 is controllable, the operation unit and the operation display units 73 can be formed at any part inside or outside the display unit 50.

When the user intends to operate the display apparatus 30 for the refrigerator 10, the user observes the display unit 50 of the display apparatus 30 through the transparent touch screen 60 formed on the front surface of the display apparatus 30 and the see-through unit 71 of the printed matter 70 printed on the rear surface of the touch screen 60, reads the operation information displayed at both sides of the display unit 50, and clicks the operation point 61 disposed at the front portion of the operation information according to the position of the operation display unit 73 printed on the position of the operation point 61.

When the user clicks the operation point 61, terminals inside the operation point 61 contact each other, generate coordinates information, and transmit the coordinates information to the control unit 40. The control unit 40 deduces the control information corresponding to the coordinates information, and performs the control operation requested by the user.

In the case that the operation points 61 and the operation display units 73 are formed outside the display unit 50, the user observes explanation information or position display of the operation point 61 printed on the position of the operation point 61, and operates the operation point 61, thereby controlling the refrigerator 10.

Auxiliary information for the display unit 50 can be printed on the printed matter 70 printed on the touch screen 60, and the control information, the operation information and the positions of the operation points 61 of the touch screen 60 can be displayed together. In this case, the display apparatus 30 can be operated by using only the touch screen 60.

As discussed earlier, in accordance with the present invention, the front surface of the display apparatus for the refrigerator is covered with the touch screen without using a special exterior finishing member. The user can observe the display unit of the display apparatus through the transparent touch screen.

In addition, the printed matter is printed on the touch screen installed on the front surface of the display apparatus for the refrigerator, for assisting the information displayed on the display unit of the display apparatus, and displaying the explanations and positions of the operation points of the touch screen. Thus, the functions of the touch screen are improved.

Furthermore, the printed matter for displaying the operation information is formed on the touch screen adhered to the front surface of the display apparatus for the refrigerator, so that the display apparatus can be operated by using only the touch screen.

Although the preferred embodiments of the present invention have been described it is understood that the present invention should not be limited to these preferred embodiments but various changes and modifications can be made by one skilled in the art within the spirit and scope of the present invention as hereinafter claimed.

The invention claimed is:

1. A display apparatus for a refrigerator, comprising:
a control unit for controlling the refrigerator;
a display unit installed on the front surface of the control unit, for displaying information from the control unit;
a transparent touch screen installed to cover the front surface of the display unit and the front surface of the control unit, and electrically connected to the control unit, for applying a clicking input of the user to the control unit;
a first printed matter printed on the touch screen except the portion corresponding to the display unit; and
a second printed matter printed with operation points of the touch screen on the touch screen and with operation display units for displaying operation information displayed on the display unit,
wherein the display unit is externally shown through the transparent touch screen.

2. The display apparatus of claim 1, wherein the second printed matter printed with operation display units is for displaying operation points of the touch screen on the touch screen, the second printed matter printed at an outer portion of the display unit.

3. The display apparatus of claim 1, wherein the first printed matter is opaque.

4. The display apparatus of claim 1, wherein the printed matter is opaque.

* * * * *